July 26, 1960 D. V. GEPPERT ET AL 2,946,936

SEMICONDUCTOR DEVICE

Filed March 5, 1954 2 Sheets-Sheet 1

INVENTORS.
Donovan V. Geppert,
BY James W. Corn,
Mueller & Aichele
Att'ys.

July 26, 1960 D. V. GEPPERT ET AL 2,946,936

SEMICONDUCTOR DEVICE

Filed March 5, 1954 2 Sheets-Sheet 2

INVENTORS.
Donovan V. Geppert,
BY James W. Corn,
Mueller & Aichele
Att'ys.

United States Patent Office 2,946,936

Patented July 26, 1960

2,946,936

SEMICONDUCTOR DEVICE

Donovan V. Geppert and James W. Corn, Phoenix, Ariz., assignors to Motorola, Inc., Chicago, Ill., a corporation of Illinois Filed Mar. 5, 1954, Ser. No. 414,385

13 Claims. (Cl. 317—235)

Figures 1, 2:
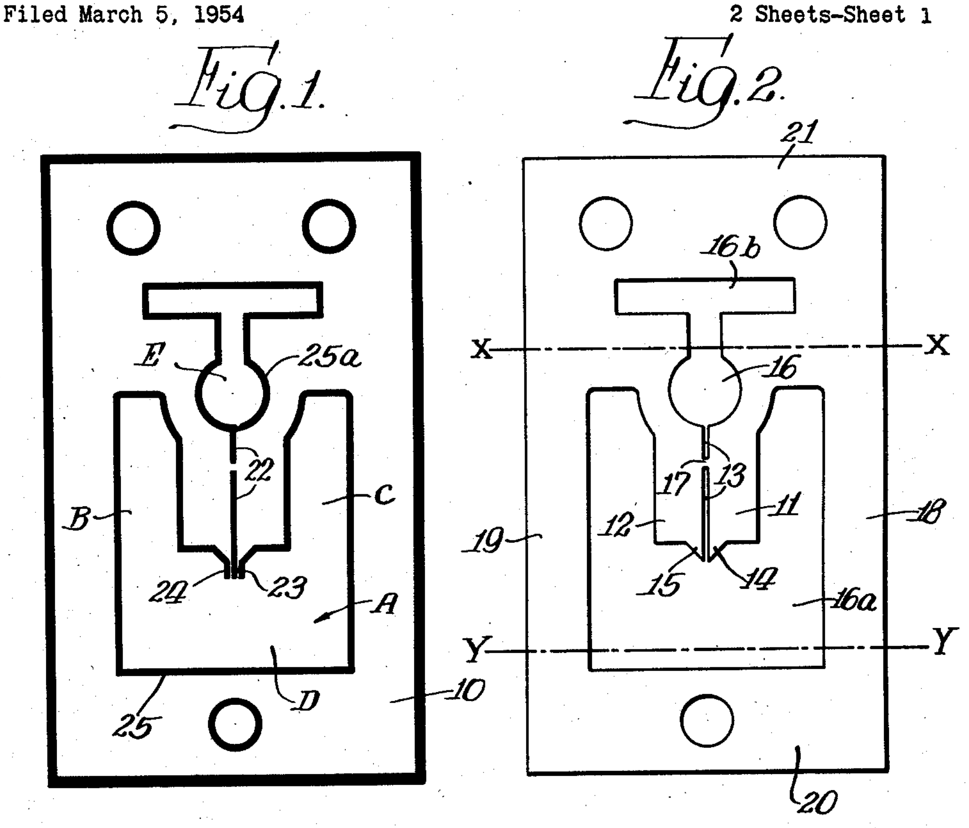

The present invention relates to semi-conductor circuit elements, and more particularly to an improved transistor unit of the point contact type and to a method for manufacturing such a unit.

The point contact type of transistor usually comprises a crystal of semi-conductive material such as germanium or silicon that has been treated with certain impurities. These impurities may be of the donor or acceptor types depending upon whether an N-type semi-conductor or P-type is required. The transistor includes a pair of electrodes known respectively as the emitter and collector which are in point contact with one surface of the crystal. A metal block or tab is also provided and affixed to another surface to constitute the base electrode.

The emitter and collector electrodes in the prior art usually take the form of a pair of fine wires. These are usually supported by the transistor casing to extend perpendicularly to a surface of the crystal and have pointed ends in point contact with that surface. These wires have a diameter of the order of .002 inch and their points are spaced about .002 inch on the surface of the crystal. It is obvious that such electrodes require a high degree of manual dexterity in their assembly to mount and achieve the proper placement thereof due to their microscopic size and spacing. Since these prior art assemblies require visual adjustment and a high degree of manual proficiency, their construction is complicated and expensive, and it is difficult to maintain uniformity in the product when the units are fabricated on a mass production basis.

Copending application Serial No. 358,241 filed May 29, 1953, in the name of Gerald C. Rich, entitled "Semi-Conductor Unit" and assigned to the present assignee, discloses a transistor construction that utilizes photo-engraving techniques precisely to space the transistor electrodes so as to obviate the need for manual adjustment thereof. The electrodes are in the form of elongated metallic strips minutely spaced one from the other on an insulating base, and these electrodes are held against an edge of a semi-conductor crystal to establish point contact therewith. The present invention also uses photo-engraving techniques to provide an improved transistor unit.

It is, accordingly, an object of the present invention to provide an improved, rugged and stable point-contact transistor assembly in which the electrodes thereof are fabricated in a simplified manner by mechanical rather than manual techniques for accurate dimensioning and positioning of these electrodes.

Another object of the invention is to provide such an improved transistor unit which is constructed so that precise control of the contact pressure of the electrodes with the crystal is effected during the fabrication process to enhance the physical stability of the unit and its electrical performance.

A further object of the invention is to provide such an improved transistor unit that may be produced on a mass production basis, and which is constructed so that units so produced have uniform characteristics and are not subject to variations from one unit to the next.

A still further object of the invention is to provide such an improved transistor unit that exhibits improved electrical stability when operated at high temperatures.

Yet another object of the invention is to provide an improved process for fabricating such transistor units.

A feature of the invention is the provision of a transistor unit in which the emitter and collector electrodes are in the form of thin, resilient, precisely and minutely spaced metallic strips, which strips are supported on a post mounted on a base in such a manner that the tips of the electrodes may be brought into contact with a surface of the transistor crystal with a desired contact pressure.

Another feature of the invention is the process of forming the collector and emitter electrodes from a thin sheet of resilient metal by photo-engraving techniques, the electrodes being held in a desired minutely spaced position (until the assembly is affixed to the post) by bridges formed by the metallic sheet, the bridges being then removed so that the electrodes are spaced and insulated one from the other.

Figures 3, 4:
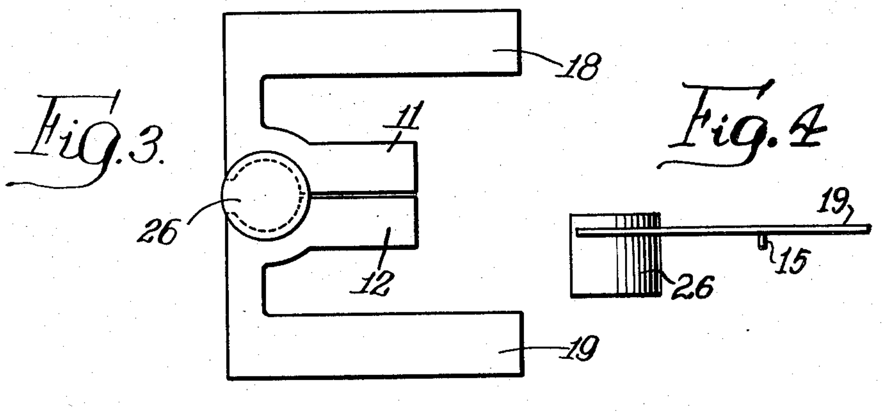
Figure 6A:
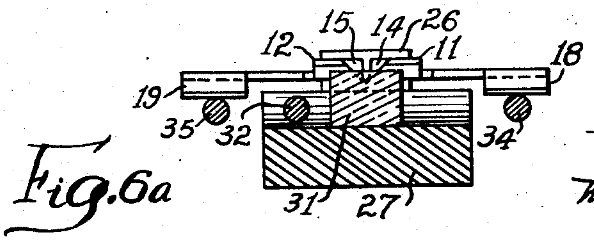
Figures 5, 6, 7, 8, 9:
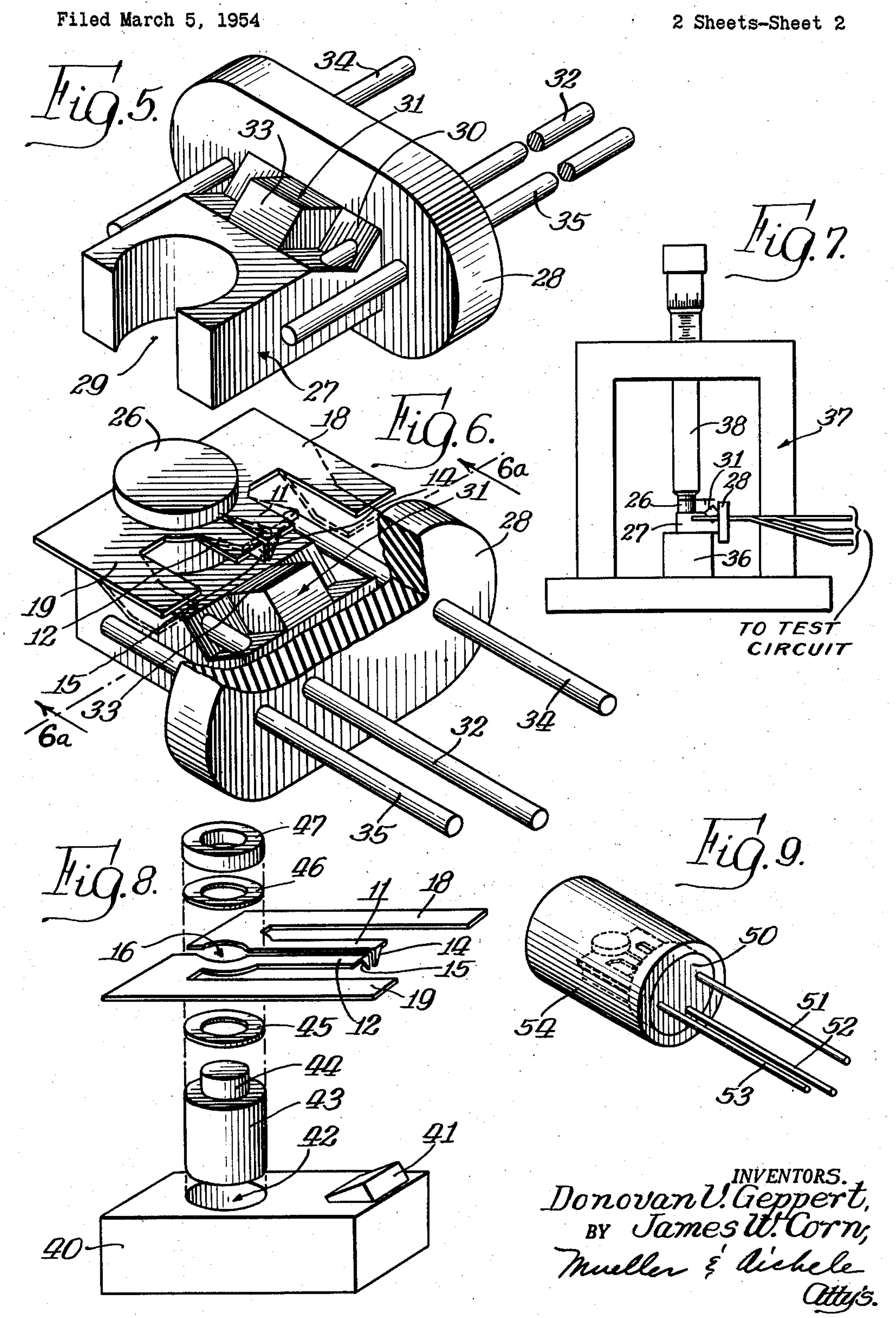

The above and other features of the invention which are believed to be new are set forth with particularity in the appended claims. The invention itself, however, together with other objects and advantages thereof may best be understood with reference to the following description when taken in conjunction with the accompanying drawings in which:

Fig. 1 is a master drawing of the electrode structure of the invention,

Fig. 2 shows the electrode structure during an intermediate stage of its production, Figs. 3 and 4 are top and side views respectively of the electrode structure affixed to a supporting post, Fig. 5 shows another portion of the transistor unit of the invention which is adapted to receive the electrode structure of Figs. 3 and 4, Fig. 6 shows the transistor unit in a partially assembled condition, Fig. 6*a* on the first sheet of the drawings is a sectional view taken generally along the line indicated by the section line 6—6 in Fig. 6 on the second sheet of drawings, but with the illustrated portion of the transistor unit of Fig. 6 in an assembled instead of a partially assembled condition.

Fig. 7 shows a fixture used in assembling the transistor unit, and

Figs. 8 and 9 respectively show an exploded and an assembled view of a second embodiment of the invention.

The present invention provides a transistor unit which comprises a base member with a crystal of semi-conductive material supported thereon. A supporting post is mounted on the base and extends outwardly therefrom, and a pair of resilient metallic strips are supported in uni-planar spaced insulated relation on the post, with the strips extending across the base in spaced relation therewith and having respective extremities remote from the post in point contact with the crystal.

The invention also provides an improved method for producing the electrode structure for such a transistor. This method comprises preparing a master drawing having a first line defining an area and a second line connected to the first line and extending from the area, and preparing a photographic negative from the drawing with reduced dimensions with respect thereto. A photo sensitive resist is applied to a thin metallic sheet, and portions of the resist are developed through the negative. Portions of the resist are then removed to expose those portions of the metallic sheet that correspond to the lines of the drawing; and these portions of the sheet are etched through by any suitable etching solution to provide an opening in the sheet corresponding to the area defined by the first line of the drawing, and also to provide a thin slit extending from the opening and which corresponds to the second line of the drawing. A supporting post is inserted through the opening and the sheet is secured to the post. Finally, the sheet is cut along a line extending across the opening to provide two spaced and mutually insulated sections of the sheet which are supported by the supporting post.

Referring now to the drawings and more particularly to Figures 1–4, the improved transistor of the present invention may be fabricated in the following manner. A relatively large sheet of photographic paper is exposed and developed to produce a smooth black finish. A master drawing of the emitter and collector electrodes of the transistor is then prepared using, for example, a white water paint on the black surface of the photographic paper. This drawing, for convenience, is made much larger than the size of the final electrodes. For example, where the final size of the electrodes is to be of the order of ¼″ x ⅜″, the drawing can be made thirty times larger, or of the order of 7″ x 11″.

The master drawing is shown in Figure 1 and, as stated above, this drawing is made in white ink upon the black surface of an exposed and developed sheet 10 of photographic paper. White lines are so drawn on the black surface of sheet 10 to inscribe the illustrated figure. That is, a line 25 defines a first area A of U-shaped configuration, this area having spaced leg portions B and C extending from a common portion D. A line 22 extends from the common portion of area A between the legs, and a line **25*a* is connected to line 22** and defines a second area E between the ends of the legs B and C. A negative is then prepared from the master drawing and reduced in size by well-known photographic techniques, the size reduction being such that the negative is the exact size of the electrode assembly.

A resilient metallic sheet is provided having a thickness of the order of 1 mil and composed, for example, of Phosphor bronze or other suitable resilient metal exhibiting high electrical conductivity. This sheet is coated with a thin layer of photo-sensitive resist such as polyvinylalcohol. The negative is held flat over the resist coated metallic sheet by a glass plate, and the resist coating is exposed through the negative by a suitable light source such as a sun lamp. The resist is then developed by water under a faucet, and the exposed portions of the resist are hardened by immersing the sheet in a suitable solution. This solution, for example, may comprise 4 ounces of chromic acid and 1 ounce of "Duponul" in 1 gallon of water. The sheet is then rinsed to remove the unexposed resist and the remaining resist is baked at a high temperature (approximately 200° C.) to form a hard, etch resistant coating. A mild muriatic acid solution may then be used to remove any oxide film that may have formed on the metal sheet during the baking step.

The sheet is then subjected to an etching solution, such as a solution of ferric chloride, that etches completely through the portions of the metal sheet corresponding to the white lines of the master drawing and which are not covered by the exposed resist. The exposed resist may then be removed from the sheet by boiling the assembly in any known solution, such as sodium hydroxide, suitable for this purpose. The resulting structure is as shown in Figure 2, and it has a U-shaped opening **16*a* corresponding to the area A and a circular opening 16 corresponding to the area E, the latter opening having a projecting portion 16*b* and these openings being connected by a thin slit 13. This configuration of the electrode structure provides a pair of elongated electrodes 11, 12 which are separated from each other by slit 13 and which have respective pointed tips 14, 15. The width of slit 13** and the resultant spacing between the electrodes is of the order of 1–2 mils.

By making line 22 discontinuous, as shown in Fig. 1, a bridge 17 is formed across slit 13 corresponding to each discontinuity of that line. This bridge maintains constant spacing between electrodes 11 and 12 during subsequent stages of assembly of the transistor, and it can be removed after the unit is completely assembled by passing a relatively high current through the electrode structure and burning it off in a fuse-like manner.

The electrode structure also includes a pair of elongated portions 18 and 19 which are spaced from electrodes 11 and 12 on either side thereof. Portions 18 and 19 terminate in a transverse bridge portion 20 at one end of the electrode assembly, and portions 18, 19 terminate in a transverse bridge portion 21 at the other end of the assembly. The bridge portions 20 and 21 serve to hold the electrode assembly as an integral unit, with electrodes 11 and 12 minutely spaced one from the other as illustrated in Fig. 2.

Readverting to Fig. 1, it can be seen that the ends 23, 24 of line 25 which define the pointed tips 14, 15 of electrodes 11 and 12 have their extremities drawn parallel to line 22 instead of coming to a point. The reason for this is that the undercutting of the metal sheet during the etching process, which undercutting is an adjunct of such process, would otherwise produce rounded ends instead of sharp tips. However, when the extremities of lines 23, 24 are drawn spaced and parallel to line 22, as shown, the undercutting between these lines produces the desired sharp tips 14 and 15 for electrodes 11 and 12.

As a next step in the process, a post (which in one embodiment of the invention is plastic) is inserted through the opening 16. This post is designated 26 in Figures 3 and 4, and the electrode assembly is imbedded therein. The assembly may be imbedded in post 26 either in a single molding operation, or by mating two extruded plastic parts together on opposite sides of the electrodes and binding the parts by heat or a solvent, or both. The tips 14 and 15 of electrodes 11, 12 are bent downwardly at right angles to the plane of the assembly, and the metal sheet is cut along the lines X—X and Y—Y to remove the bridges 20, 21 since they are no longer needed to hold electrodes 11, 12 in their spaced uniplanar position. The bridge 17 may now be removed in the manner previously described.

Electrodes 11 and 12 are now firmly supported by post 26 mutually insulated and spaced one from the other by a minute amount. This is achieved without the requirement for undue manual dexterity as is the case with most prior art transistors whose emitter and collector electrodes are formed by catwhiskers or the like. A temporary electrical connection is then made to portion 18 which ultimately forms the emitter lead (as will be described), and the unit is inserted into an electro-plating bath with the emitter lead portion 18 and emitter electrode 11 acting as the cathode. By using an appropriate solution and in accordance with well established electro-plating techniques, it is then possible to electroplate the emitter electrode 11 with a thin coating of zinc, cadmium, nickel, or other suitable metal. The collector electrode does not become plated during this operation since no electrical connection is made to it. This plating of the emitter electrode has been found to obviate the tendency of the emitter to become formed during the well-known electro-forming of the collector, and the plating also obviates this tendency during operating or handling of the completed transistor. This results in a transistor having higher power gain than those with unplated emitters and also having superior electrical stability.

A further portion of the transistor is shown in Fig. 5, and this portion includes a metallic block 27 which is affixed to an insulating base 28 composed, for example, of ceramic or other suitable dielectric material. Block 27 may be composed, for example, of brass and is machined to have the illustrated configuration. That is, the block has an aperture 29 formed therein to receive post 26 of the electrode assembly, and it also has a V-shaped groove 30 extending across a surface thereof. A rectangular block-shaped crystal 31 of germanium or other semi-conductive material is soldered or otherwise affixed to the block in the groove, with at least one surface of the crystal in electrical contact with the block. In this manner, block 27 forms a base electrode for the crystal, and a lead 32 of electrically conductive material extends through the base 28 and through apertures in block 27 to make electrical contact with the block.

The crystal 31 is etched in well-known manner to exhibit the desired transistor characteristics. The post 26 in which electrodes 11, 12 are imbedded is inserted a short distance into aperture 29 in block 27, as shown in Figure 6, with the tips 14, 15 of the electrodes spaced slightly from the surface 33 of crystal 31. A pair of connecting leads or pins 34, 35 extends through base 28, with the leads being disposed on either side of block 27 and spaced from the block. The latter leads are soldered or otherwise connected respectively to the portions 18, 19 and form respective connections to the emitter and collector electrodes 11, 12.

The unit is connected to any suitable electrical test circuit which indicates when the tips 14, 15 contact the surface 33 of crystal 31. The unit is placed on a pedestal 36 (Figure 7) in a fixture 37, with the partially distended post 26 extending upwardly. A micrometer drive 38 is mounted in fixture 37, and this drive is rotated manually to force post 26 into the aperture 29 in block 27 until the tips 14, 15 contact the crystal surface, as indicated by the test circuit. The micrometer is then given a selected number of additional turns to move the post an additional amount (for example, 10 mils) to deflect the electrodes 11, 12 and set the pressure of the contacting tips thereof.

The unit may then be placed in a mold and potted in a plastic resin, or it may be hermetically sealed in a metal can soldered to a metal ring bonded around base 28. As can be seen, the final assembly is in the form of a pair of flat resilient U-shaped members 11, 18 and 12, 19 supported in uni-planar spaced, insulated relation on post 26. These members extend across the top surface of block 27 in spaced and substantially parallel relation therewith; and they have adjacent minutely spaced inner legs 11, 12 whose extremities make point contact with crystal 31, and respective outer legs 18, 19 to which leads 34, 35 are connected.

In order to illustrate the general relation between the elements of this embodiment of the invention, Fig. 6 shows the parts of the transistor, exclusive of the covering, in a partially assembled form. The post 26 is raised above its final assembled position, and the metallic strip members 11—18, and 12—19, mounted on the post 26 are illustrated as raised above their final assembled position as described in the preceding paragraph. The contacts 14 and 15 are removed from the crystal 31, and the arms 18 and 19 are spaced from their corresponding connecting pins 34 and 35 respectively. These latter elements are shown in dotted lines to indicate the direction they are moved out of a perfectly planar position for their final assembly of Fig. 6*a*, which shows all of these elements in a finally assembled condition through a cross-sectional view taken generally along the line 6*a*—6*a* of Fig. 6. In this Fig. 6*a*, the outer legs 18 and 19 are shown soldered to the pins 34 and 35 respectively, and the contacts 14 and 15 are in mechanical as well as electrical engagement with the crystal 31.

The embodiment of Figures 8 and 9 is similar in some respects to the embodiment described above. In the latter, a base 40 is provided in the form of a rectangular block of brass or other suitable electrically conductive material. A semi-conductive crystal 41 of triangular shape is soldered to block 40 in the position shown and in electrical contact with the block so that, as in the previous embodiment, the latter may form a base electrode for the crystal. Block 40 has an aperture 42 therein which receives a post 43 which, in this instance, is composed of metal such as brass, and which may be received in press fit in the aperture.

The brass post has certain advantages over a plastic post, in that the tolerances for a press fit are easier to hold in the brass than in plastic. Moreover, since plastic has a temperature coefficient of expansion that is several times as great as metal, difficulties have been encountered in maintaining a firm press fit between the plastic post and the metal block over wide temperature ranges. These difficulties are overcome by using a brass post in a brass block since the temperature coefficients of both parts match closely. Moreover, the temperature coefficient of the Phosphor bronze electrodes closely matches that of the present post.

The upper end of metal post 43 is turned down to a reduced portion 44 at its upper end. An insulating washer 45 composed, for example, of mica is fitted over portion 44 and rests against the shoulder formed between this portion and the remainder of the post. The electrodes 11, 12, while still in the form shown in Fig. 2, are fitted over the reduced portion 44 through opening 16 with the bore of the opening spaced from the reduced portion 44 so that the electrode assembly is insulated from the post. The electrode assembly is held against washer 45 by a further insulated washer 46 which also may be composed of mica; and the assembly is secured by a collar 47, which may be composed of brass and which is fitted over reduced portion 44 in press fit therewith. As previously noted, when portions 47, 43 and 40 are all composed of the same metal, a firm press fit may be maintained throughout a wide temperature range.

The retaining bridges 20, 21 of the assembly can now be removed in the manner discussed previously in conjunction with Fig. 2, and the unit can be assembled in the same way as described in conjunction with Figures 6 and 7.

As shown in Fig. 9, the transistor unit is supported in spaced relation from an insulated base 50 by leads 51, 52 and 53, the leads being connected respectively to block 40 and to portions 18, 19. The unit is then enclosed by a cylindrical plastic or metal cover 54 which is sealed to base 50.

Units constructed in accordance with the invention have been found to exhibit low base resistance, of the order of 30 ohms; low emitter resistance of about 80 ohms; high alpha or current gain, approximately 3.5; high collector impedance, average of 10,000 ohms; low collector current at zero emitter current, average of 0.5 milli-amperes at 10 volts; and low noise factor, about 39 decibels at 1 kilocycle.

The transistor units of this invention are constructed with a minimum amount of human skill, and the operations required are readily adaptable to maximum production techniques. In accordance with the invention, accurate minute separation between the collector and emitter electrodes is achieved mechanically rather than manually, and a desired contact pressure for mechanical and electrical stability is obtained in a simple and expeditious manner. The units have been found to be readily susceptible to electroforming, and have been found to be extremely rugged and capable of withstanding rough usage.

An additional advantage in units of the embodiment of the invention shown in Figures 8 and 9 is the high temperature to which such a unit can be raised before any damage occurs. By using a high temperature solder to solder the crystal to the metal block, it is possible to encapsulate the unit in a glass bulb analogous to vacuum tubes. This provides a transistor capable of storage at several hundred degrees centigrade, with an upper operating temperature limited only by the intrinsic temperature characteristics of the crystal itself. The glass bulb may be filled with dry helium before sealing to maintain the unit free from any chemical change.

While particular embodiments of the invention have been shown and described, modifications may be made and it is intended in the appended claims to cover all such modifications that fall within the true spirit and scope of the invention.

We claim:

1. A transistor unit including in combination, a metallic block having an aperture therein, a crystal of semi-conductive material having a surface affixed to a surface of said block in electrical contact therewith, a supporting post disposed in said aperture of said metallic block and extending outwardly from said surface of said block, and a pair of resilient metallic strips mounted on said supporting post in adjacent mutually spaced insulated relation, said strips extending from said post in a plane spaced from said surface of said block and substantially parallel therewith, and said strips having respective bent-over tips remote from said post in point contact with said crystal.

2. A transistor unit including in combination, a metallic block having an aperture therein, a crystal of semi-conductive material having a surface affixed to a surface of said block in electrical contact therewith, an electrically conductive lead connected to said block, a supporting post disposed in said aperture of said metallic block and extending outwardly from said surface of said block, a pair of flat resilient substantially U-shaped metallic members mounted on said supporting post in uni-planar mutually spaced insulated relation and extending from said post in spaced and substantially parallel relation with said surface of said block, said U-shaped members having respective inner legs adjacent but spaced from one another and having respective outer legs, said inner legs having extremities remote from said post in point contact with said crystal, and a pair of electrically conductive leads respectively connected to said outer legs.

3. A transistor unit including in combination, a metallic block having an aperture therein, a crystal of semi-conductive material having a surface affixed to a surface of said block in electrical contact therewith, an electrically conductive lead connected to said block, a metallic post disposed in said aperture of said metallic block in press-fit with said block and extending outwardly from said surface of said block, a pair of flat resilient substantially U-shaped metallic members mounted on said post in uni-planar mutually spaced relation and extending from said post in spaced and substantially parallel relation with said surface of said block, means for insulating said U-shaped members from said post, said U-shaped members having respective inner legs adjacent but spaced from one another and having respective outer legs, said inner legs having bent-over tips remote from said post in point contact with said crystal, and a pair of electrically conductive leads respectively connected to said outer legs.

4. A transistor unit including in combination a metallic base having an aperture therein, a crystal of semi-conductive material having a surface affixed to a surface of said base in electrical contact therewith, a supporting post disposed in said aperture of said metallic base and extending outwardly from said surface of said base, and a pair of resilient metallic strips mounted on said supporting post in adjacent mutually spaced insulated relation, said strips extending from said post in a plane spaced from said surface of said base and having tips remote from said post in point contact with said crystal.

5. A transistor unit including in combination a metallic base having an aperture therein; a crystal of semi-conductive material having a surface affixed to a surface of said base in electrical contact therewith; a further base having first, second and third leads extending therethrough, said first lead being affixed to said metallic base in electrical contact therewith; the metallic post disposed in said aperture of said metallic base in press-fit with such base and extending outwardly from said surface thereof, said post having a reduced portion at its upper end forming a shoulder with the remainder of said post; first and second flat resilient substantially U-shaped metallic members mounted on said reduced portion of said post in uniplanar mutually spaced relation and extending from said post in spaced relation with said surface of said metallic base; a pair of insulating washers respectively disposed on said reduced portion of said post between said U-shaped members and said shoulder and over said U-shaped members, a collar mounted on said post for retaining said U-shaped members between said washers in an assembled condition on said post and insulated therefrom; said U-shaped members having respective inner legs adjacent but spaced from one another and having respective outer legs, said inner legs having tips remote from said post in point contact with said crystal; and said second and third leads being affixed respectively to said outer legs of said members in electrical contact therewith.

6. The transistor unit defined in claim 4 in which one only of said metallic strips is plated with a different metal.

7. The transistor unit defined in claim 4 in which said metallic strips are composed of Phosphor bronze and one only of said strips is electroplated with zinc.

8. The method of making transistor units comprising forming a metallic plate into a multiple-lead assembly including a plurality of leads and a joining portion connecting two of the leads, securing the lead assembly in a transistor header structure with a semi-conductor unit engaged by said leads and connected by said leads to a pair of pin connections, soldering each lead to a corresponding pin connection, and severing the joining portion to separate the leads.

9. The method of making semiconductor devices comprising forming a metallic plate into a multiple-lead assembly including a severable joining portion connecting two of the leads, mounting the assembly in engagement with connector elements extending through a mounting base and also in engagement with a semiconductor unit supported on the mounting base, securing the assembly in such a position, and severing the joining portion including soldering each of the two leads to a corresponding connector element.

10. The method of making semiconductor devices comprising forming a metallic plate into a multiple lead assembly having a severable joining portion connecting two of the leads, mounting a crystal semiconductor unit on a mounting base means having connector pins insulatingly supported therein, mounting the multiple-lead assembly on the base means with one of the leads of said assembly extending between the crystal semiconductor unit and a connector pin and another lead extending between the crystal semiconductor unit and another connector pin, securing each of said leads of said assembly to a corresponding connector pin by soldering, and severing the joining portion to electrically and mechanically separate such leads.

11. A transistor unit including in combination base means having metal and insulating portions, a semiconductor crystal unit secured on one side to the metal portion of said base means and electrically connected thereto, a plurality of connector pins mounted in the base means and extending longitudinally in a direction from such base means opposite to the position of the semiconductor crystal unit mounted on the base means and with each pin insulated from the metal portion thereof, and flat metal connector means originally in a connected metal assembly having a severable portion which is severed to provide a plurality of flat metal connectors, with each such flat metal connector in electrical and mechanical connection with a connector pin and with the semiconductor unit but with such flat metal connectors insulated from one another by the severance.

12. A transistor unit including in combination, mounting means, a semiconductor crystal unit secured on the mounting means to a metal portion thereof, a pair of connecting pins in said mounting means and extending through the same, with each of said connecting pins electrically connected with the semiconductor crystal unit on one side of the mounting means and adapted at the other side of the mounting means for connecting the transistor unit into electrical apparatus, and a metallic member having a pair of arms with each engaging a point on the crystal unit and spaced apart from one another thereon and with each also engaging a connecting pin, said metallic member including a severable portion joining the arms and with such arms being electrically separated from one another upon removal of the severable portion, with one of such arms acting as the electrical connection between the crystal unit and a corresponding connecting pin, and the other arm serving a corresponding function between said crystal unit and the other connecting pin, and with each of said connecting pins being connectable with electrical apparatus.

13. In a transistor, the combination including mounting means having respective metal and insulating portions in direct physical connection with one another, connecting pins in said mounting means with each supported in the insulating portion and adjacent the metal portion, a semiconductor crystal unit on the metal portion of said mounting means in a soldered connection therewith, flat metal means for mechanically and electrically connecting said crystal unit and said pins lying substantially in one plane including a pair of flat metallic strips with one such strip extending between each pin and said crystal unit and forming an electrical connection therebetween, and a soldered connection between each connecting pin and the corresponding flat metal strip, with each said connecting pin having one portion on one side of said mounting means for said connection to a metallic strip and with another portion on the other side of the mounting means for connecting the transistor into electrical apparatus.

References Cited in the file of this patent

UNITED STATES PATENTS

| | | |
|---|---|---|
| 1,217,289 | Eustice | Feb. 27, 1917 |
| 2,441,960 | Eisler | May 25, 1948 |
| 2,615,965 | Amico | Oct. 28, 1952 |
| 2,660,696 | James et al. | Nov. 24, 1953 |
| 2,673,311 | Amico | Mar. 23, 1954 |
| 2,696,575 | Fogg | Dec. 7, 1954 |
| 2,724,077 | Dunlap | Nov. 15, 1955 |
| 2,744,308 | Loman | May 8, 1956 |
| 2,762,956 | Ingraham | Sept. 11, 1956 |

FOREIGN PATENTS

| | | |
|---|---|---|
| 201,092 | Great Britain | July 26, 1923 |
| 602,492 | Great Britain | May 28, 1948 |

UNITED STATES PATENT OFFICE

CERTIFICATION OF CORRECTION

Patent No. 2,946,936 July 26, 1960

Donovan V. Geppert et al.

It is hereby certified that error appears in the above numbered patent requiring correction and that the said Letters Patent should read as corrected below.

Column 8, line 50, strike out ", and severing the joining portion" and insert the same after "element" and before the period in line 52, same column.

Signed and sealed this 13th day of June 1961.

(SEAL)
Attest:

ERNEST W. SWIDER
Attesting Officer

DAVID L. LADD
Commissioner of Patents